United States Patent
Lim

(10) Patent No.: US 8,549,181 B2
(45) Date of Patent: Oct. 1, 2013

(54) SEMICONDUCTOR MEMORY DEVICE AND METHOD OF OPERATING THE SEMICONDUCTOR MEMORY DEVICE

(75) Inventor: Eui Cheol Lim, Hwasung-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 133 days.

(21) Appl. No.: 12/613,756

(22) Filed: Nov. 6, 2009

(65) Prior Publication Data

US 2010/0115142 A1    May 6, 2010

(30) Foreign Application Priority Data

Nov. 6, 2008    (KR) .................. 10-2008-0109895

(51) Int. Cl.
*G06F 3/00*    (2006.01)
(52) U.S. Cl.
USPC .............................................................. 710/5
(58) Field of Classification Search
None
See application file for complete search history.

(56) References Cited

U.S. PATENT DOCUMENTS

| | | | |
|---|---|---|---|
| 5,507,005 A * | 4/1996 | Kojima et al. .................. | 710/52 |
| 6,952,753 B2 | 10/2005 | Ralphs | |
| 7,050,940 B2 | 5/2006 | Basso et al. | |
| 2007/0198771 A1* | 8/2007 | Seo .............................. | 711/106 |
| 2007/0233943 A1* | 10/2007 | Teh et al. ...................... | 711/105 |
| 2007/0266387 A1* | 11/2007 | Henmi .......................... | 718/102 |
| 2008/0065648 A1* | 3/2008 | Gupta et al. .................... | 707/10 |

FOREIGN PATENT DOCUMENTS

KR    100700156    3/2007

* cited by examiner

*Primary Examiner* — Henry Tsai
*Assistant Examiner* — Aurangzeb Hassan
(74) *Attorney, Agent, or Firm* — F. Chau & Associates, LLC

(57) ABSTRACT

A method of operating a semiconductor memory device includes receiving a timeout index signal corresponding to a master of the first master group based on a residual capacity of a data buffer of the first master, setting a first timeout value in response to the timeout index signal, and changing an execution order of commands stored in a queue of the semiconductor memory device based on a result of counting the first timeout value and counting a second timeout value corresponding to a master of the second master group.

20 Claims, 9 Drawing Sheets

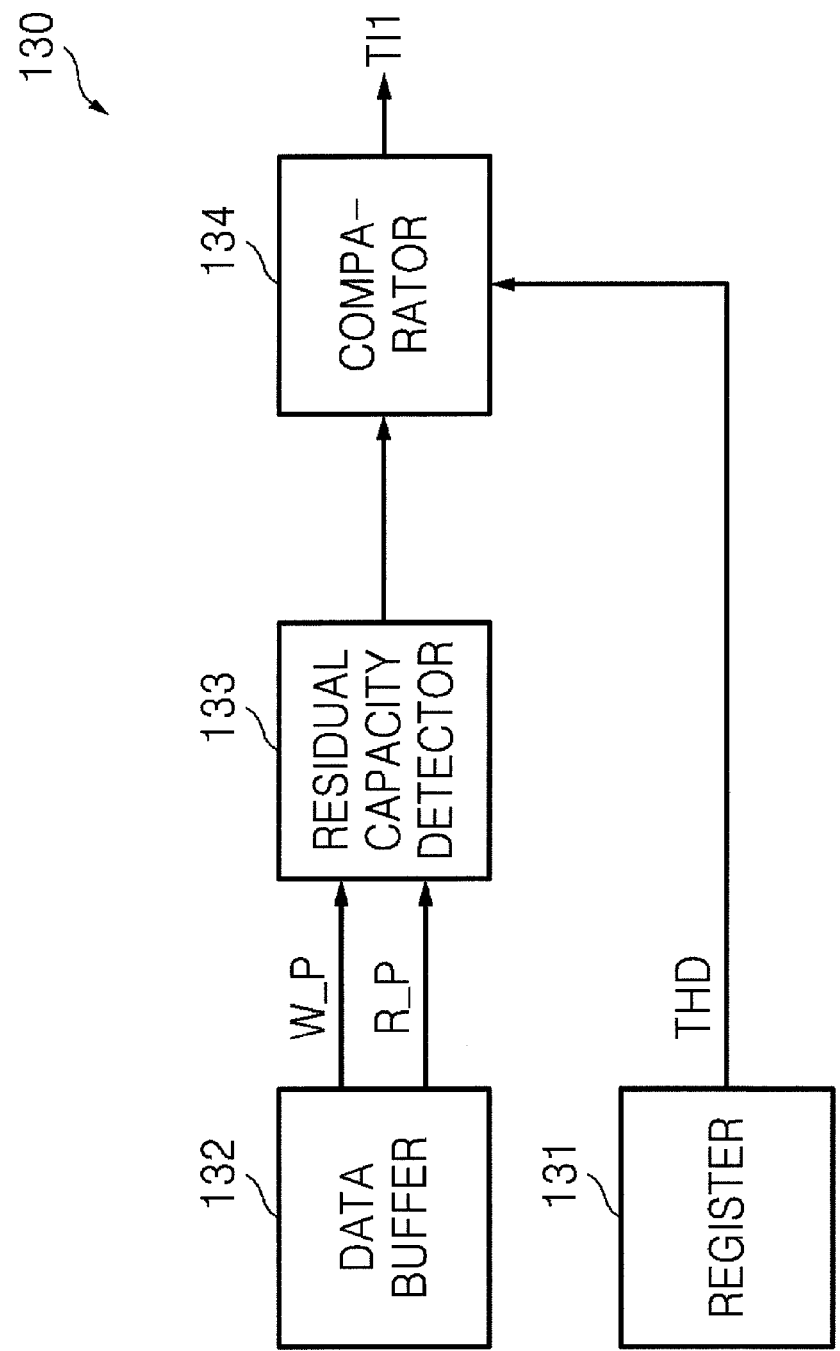

SEMICONDUCTOR MEMORY DEVICE AND METHOD OF OPERATING THE SEMICONDUCTOR MEMORY DEVICE

CROSS-REFERENCE TO RELATED APPLICATION

This application claims priority under 35 U.S.C. §119(e) to Korean Patent Application No. 10-2008-0109895, filed on Nov. 6, 2008, in the Korean Intellectual Property Office, the disclosure of which is incorporated by reference in its entirety herein.

BACKGROUND

1. Technical Field

Exemplary embodiments of the present inventive concept relate to a semiconductor memory device, and more particularly, to a method of operating a semiconductor memory device to control the order of executing commands of a plurality of masters in a semiconductor memory system based on the remaining memory capacity of each master.

2. Discussion of Related Art

In a semiconductor memory system including a plurality of masters and a semiconductor memory device, quality of service (QoS) refers to the assignment of different priorities to commands from the masters. The semiconductor device executes a command when requested by a corresponding master.

In conventional semiconductor memory systems, a controller of a semiconductor memory device may include a timeout counter that counts to a timeout value with respect to each of the commands. The priorities of the commands may be determined based on the order in which the counting with respect to the commands is completed. A timeout value for the masters may be set to a relatively small timeout value for higher priority operations (e.g., real-time operations) and to a larger timeout value for lower priority operations (e.g., operations for controlling the operation of the semiconductor memory device).

Each master may include a data buffer with a varying amount of residual memory capacity, which may be used up unless its respective commands are handled in a timely manner. When the commands are of a same type (e.g., all are for lower-priority operations), each command will have the same priority, and thus each would be handled by the semiconductor memory system at or around the same time. However, when the residual memory capacity of the data buffer of a first master is lower than a second master, performance of the system may be deteriorate unless the commands of the first master is serviced before those of the second master. Thus, there is a need for a semiconductor device that execute the commands based on the residual capacities of data buffers of masters and a method of operating said device.

SUMMARY

According to an exemplary embodiment of the present inventive concept, a method of operating a semiconductor memory device connected with a first master group including at least one master and a second master group including at least one master through a data bus includes receiving a timeout index signal corresponding to a master of the first master group and generated based on a residual capacity of a data buffer of the master, setting a first timeout value in response to the timeout index signal, and changing an execution order of commands stored in a queue of the semiconductor memory device based on a result of counting the first timeout value and counting a second timeout value corresponding to a master of the second master group.

According to an exemplary embodiment of present inventive concept, a semiconductor memory device is connected with a first master and a second master through a data bus and includes a memory controller. The memory controller includes a register block, a time out counter, and a queue. The register block receives a timeout index signal corresponding to a master of the first master group and generated based on a residual capacity of a data buffer of the master and is configured to set a first timeout value in response to the timeout index signal. The timeout counter counts the first timeout value and counts a second timeout value corresponding to a master of the second master group. The queue is configured to receive commands and store the commands. An execution order of commands stored in the queue is changed based on a result of counting the first timeout value and counting the second timeout value.

BRIEF DESCRIPTION OF THE DRAWINGS

Embodiments of the present inventive concept will become more apparent by describing in detail exemplary embodiments thereof with reference to the attached drawings in which:

FIG. 3 is a block diagram for explaining a method for detecting a residual capacity of the LCD illustrated in FIG. 1 according to an exemplary embodiment of the present inventive concept;

DETAILED DESCRIPTION OF THE EXEMPLARY EMBODIMENTS

Figure 1:
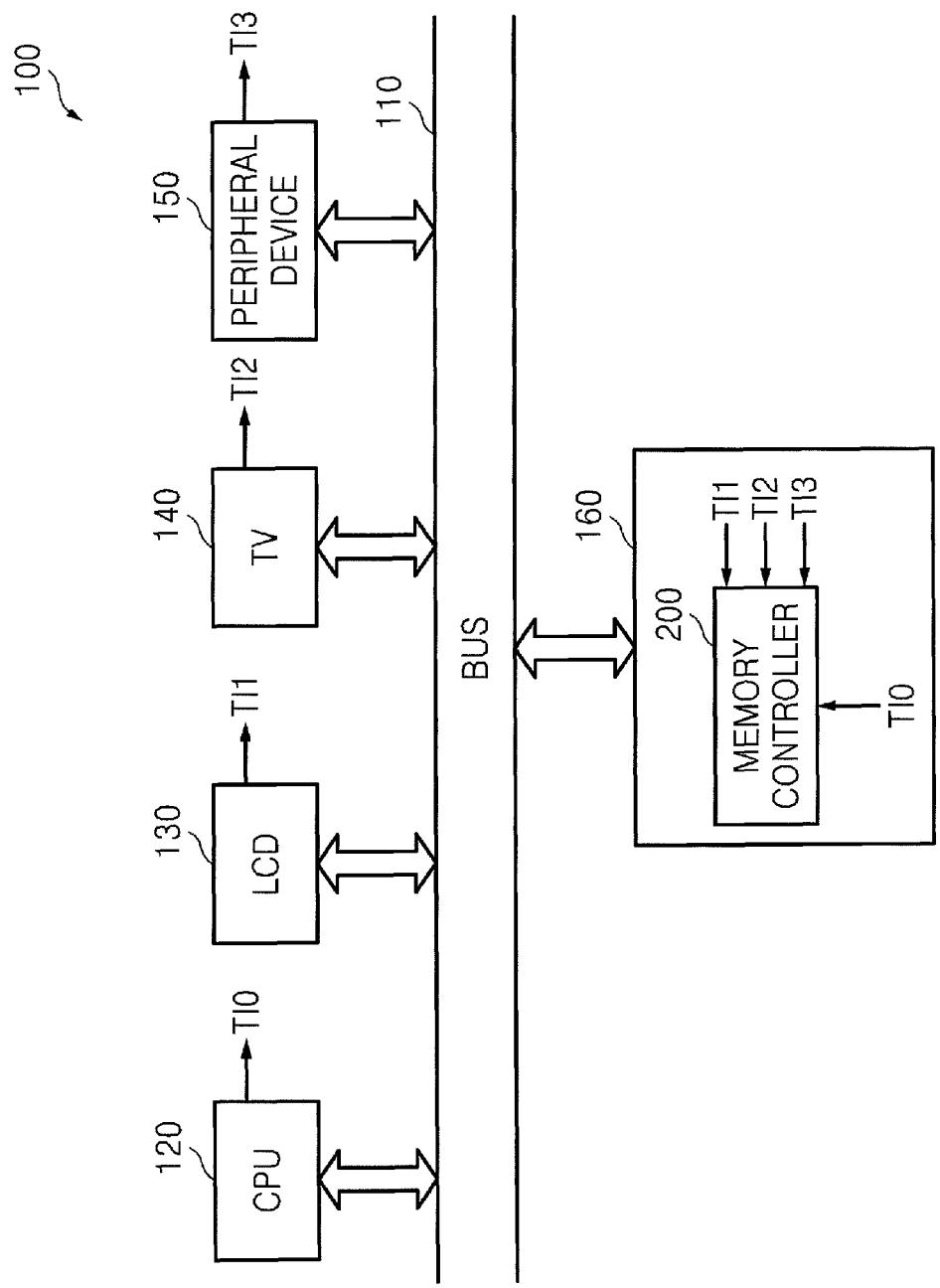
FIG. 1 is a block diagram of a semiconductor memory system including a semiconductor memory device according to an exemplary embodiment of the present inventive concept.

The present inventive concept now will be described more fully hereinafter with reference to the accompanying drawings, in which exemplary embodiments of the invention are shown. This invention may, however, be embodied in many different forms and should not be construed as limited to the exemplary embodiments set forth herein. In the drawings, like numbers refer to like elements throughout. It will be understood that when an element is referred to as being "connected" or "coupled" to another element, it can be directly connected or coupled to the other element or intervening elements may be present.

FIG. 1 is a block diagram of a semiconductor memory system 100 including a semiconductor memory device 160 according to an exemplary embodiment of the present inventive concept. The semiconductor memory system 100 includes a plurality of masters 120, 130, 140, and 150 and a semiconductor memory device 160 including a memory controller 200. Each of the masters 120 through 150 and the semiconductor memory device 160 are connected with one another through a data bus 110. Each of the masters 120 through 140 may be a controller of a corresponding master and may be embedded on a same chipset with the semiconductor memory device.

The masters 120 through 150 may be subdivided into different groups. For example, a first group of the masters (referred to as a first master group) may comprise those in which real-time operations are important and a second group of the masters (referred to as a second master group) may comprise those whose performances depend on the latency of the memory device 160. Each of the first masters may include a data buffer to buffer data associated with real-time operations to prevent the loss of data. As an example, the data buffer may be a line buffer having a first-in first-out (FIFO) structure.

In an exemplary embodiment of the present inventive concept, a liquid crystal display (LCD) 130 and a television (TV) 140, which display images in real time, and a peripheral device 150 requested to respond in real time corresponds to the first master group and a central processing unit (CPU) 120 whose performance depends on a speed supported by the semiconductor memory device 160 corresponds to the second master group.

Although not shown in FIG. 1, the second master group may include a multi format codec (MFC) subsystem to support a variety of image/data formats and a graphic engine. In FIG. 1, three masters 130 through 150 correspond to the first master group and one master 120 corresponds to the second master group. However, the present inventive concept is not restricted thereto. For example, one or more of the masters may be omitted or additional master may be added. A master may act independently of another master, while the actions of a slave device are dependent on a master.

Each of the masters 120 through 150 may generate a transaction requesting that the semiconductor memory device 160 (e.g., a dynamic random access memory (DRAM)) execute a particular command.

Figure 2A:
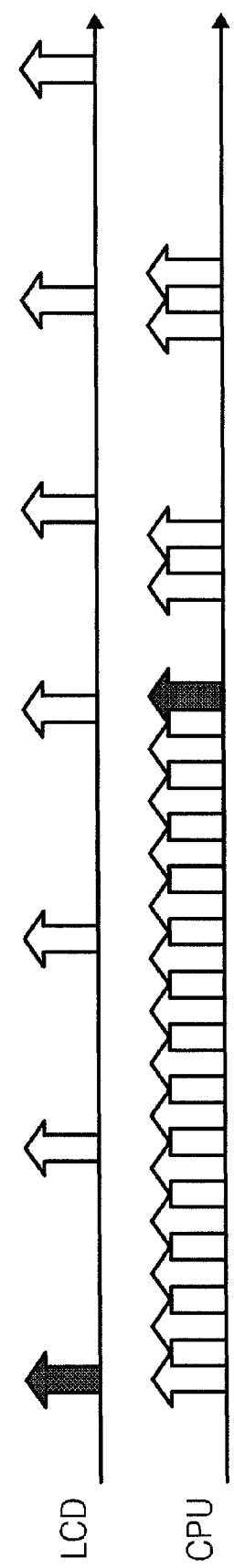
FIG. 2A is an exemplary timing chart conceptually illustrating transactions generated by a liquid crystal display (LCD) and a central processing unit (CPU) illustrated in FIG. 1.

FIG. 2A is an exemplary timing chart conceptually illustrating transactions generated by the LCD 130 and the CPU 120 illustrated in FIG. 1. Referring to FIG. 2A, while the LCD 130 generates transactions at predetermined intervals based on a clock of an image signal, the CPU 120 irregularly generates transactions according to an operation state.

Figure 2B:
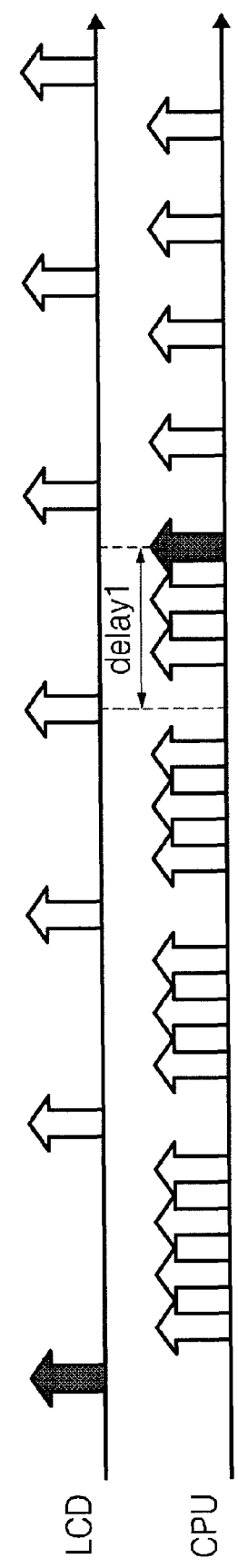
FIG. 2B is an exemplary timing chart illustrating a change in the transactions generated by the LCD and the CPU when a timeout value for the LCD is less than that for the CPU.

FIG. 2B is an exemplary timing chart illustrating a change in the transactions generated by the LCD 130 and the CPU 120 when a timeout value for the LCD 130 is less than that for the CPU 120. Referring to FIG. 2B, since the LCD 130 is serviced (e.g., a command of the LCD 230 is executed) prior to the CPU 120 during any one of its given intervals, the real-time operation of the LCD 130 may be ensured, but the performance of the CPU 120 may be deteriorated due to a service time delay "delay1". A higher frequency clock may be used to prevent the performance deterioration in the CPU 120.

Figure 2C:
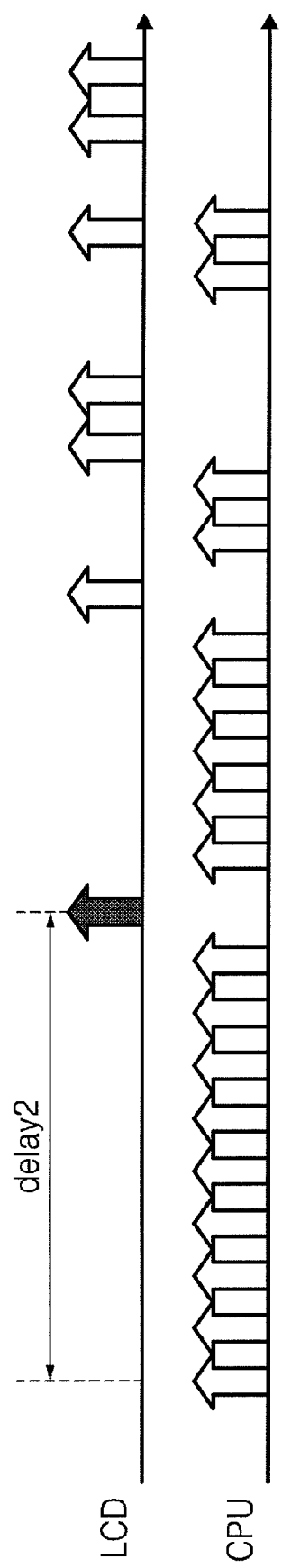
FIG. 2C is an exemplary timing chart illustrating a change in the transactions generated by the LCD and the CPU when a timeout value for the LCD is larger than that for the CPU.

FIG. 2C is an exemplary timing chart illustrating the change in the transactions generated by the LCD 130 and the CPU 120 when a timeout value for the LCD 130 is larger than that for the CPU 120. Referring to FIG. 2C, while the performance of the CPU 120 may be improved, the real-time operation of the LCD 130 may not be ensured due to a service time delay "delay2".

The semiconductor memory system 100 may improve the performance of both a first master group and a second master group by controlling a timeout value for each of the masters 120 through 150 that can be controlled as has been described with reference to FIGS. 2A through 2C.

Each of the masters 120 through 150 may be configured to generate a timeout index signal for setting a timeout value. For example, each of the devices of the first master group (e.g., masters 130 through 150) can generate a timeout index signal TI1, TI2, or TI3, respectively, based on the residual memory capacity of a data buffer (not shown) included within each of the first masters 130, 140, or 150. The timeout index signals may be derived from a predefined value stored in the memory controller 200. A timeout index signal TI0 for the second master group (e.g., master 120) may have a fixed value stored in advance in the memory controller 200.

FIG. 3 is a block diagram for explaining a method for detecting a residual capacity of the LCD 130 illustrated in FIG. 1 according to an exemplary embodiment of the present inventive concept. Referring to FIG. 3, the LCD 130 includes a register 131, a data buffer 132, a residual capacity detector 133, and a comparator 134.

The register 131 may store a threshold value THD of a residual capacity of the data buffer 132. The residual capacity of the data buffer 132 is the size of an unused portion of the data buffer 132. For example, this unused portion may be empty or include data that has been stored in the data buffer 132, but which has not yet been used for an operation of a master of the first master group (e.g., the LCD 130). The threshold value THD of the residual capacity of the data buffer 132 may be set to a percentage (e.g., 25%) of a total capacity of the data buffer 132. Alternately, the threshold value THD could specify a certain number of bits, bytes, units of bytes (e.g., 2 KB), etc.

The residual capacity detector 133 may detect the residual capacity of the data buffer 132 based on a position of a writing pointer of the data buffer 132 (hereinafter, referred to as a writing pointer position W_P) and/or a position of a reading pointer thereof (hereinafter, referred to as a reading pointer position R_P). For example, the residual capacity detector 133 may detect the residual capacity of the data buffer 132 based on a difference between the writing pointer position W_P and the reading pointer position R_P. The writing pointer position W_P and reading pointer position R_P may be received within signals received by the residual capacity detector 133 from the data buffer 132.

The comparator 134 may generate a timeout index signal (e.g., TI1), which varies with a result of comparing the residual capacity of the data buffer 132 and the threshold value THD.

Figure 4:
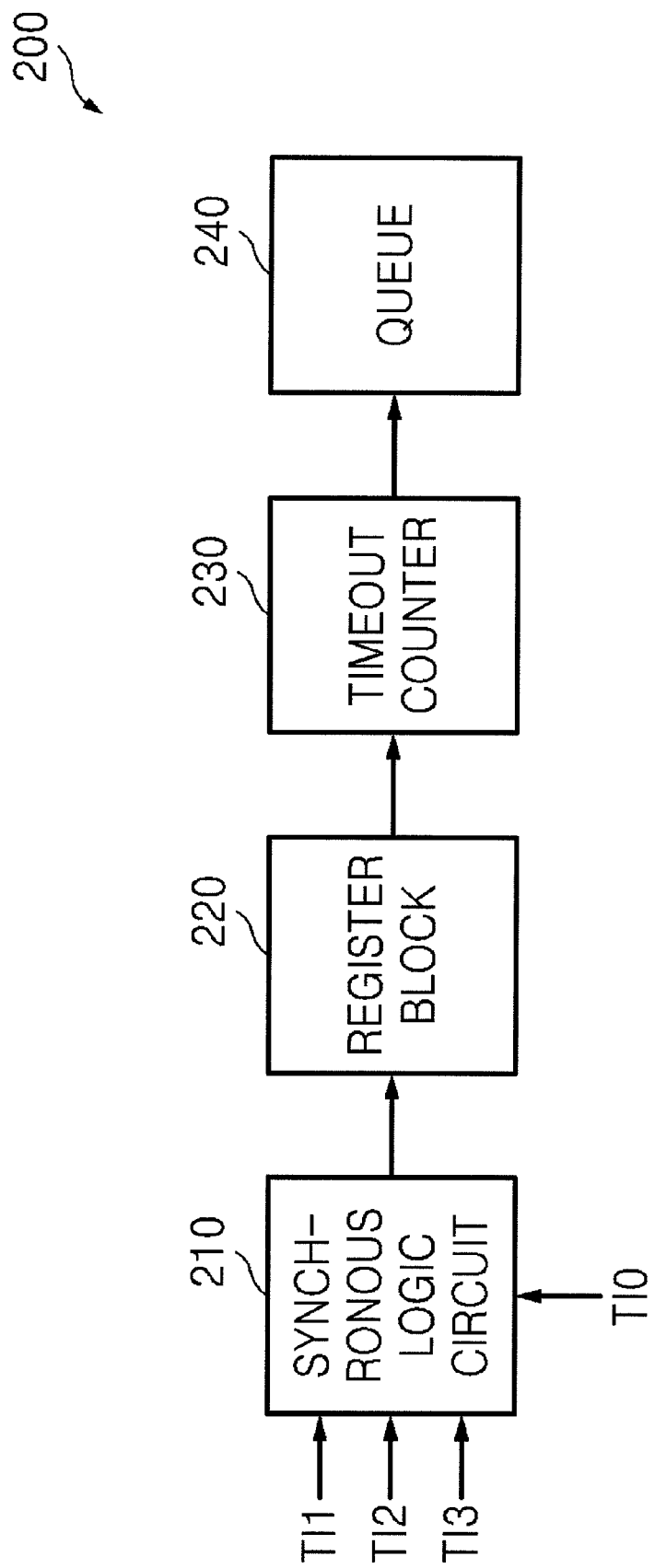
FIG. 4 is a block diagram of a memory controller illustrated in FIG. 1 according to an exemplary embodiment of the present inventive concept.

FIG. 4 is a block diagram of the memory controller 200 illustrated in FIG. 1 according to an exemplary embodiment of the present inventive concept. The memory controller 200 includes a synchronous logic circuit 210, a register block 220, a timeout counter 230, and the queue 240. The memory controller 200 may set a timeout value for each of the masters 120 through 150 in response to the timeout index signals TI0 through TI3 and change an execution order of commands based on a result of counting the timeout value for each master 120, 130, 140, or 150. The commands may be stored in the queue 240. The synchronous logic circuit 210 synchronizes an operating frequency of each of the masters 120 through 150 with a driving frequency of the semiconductor memory device 160. Accordingly, the semiconductor memory system 100 can efficiently operate on commands received from the masters 120 through 150 that have different operating frequencies.

Figure 5:
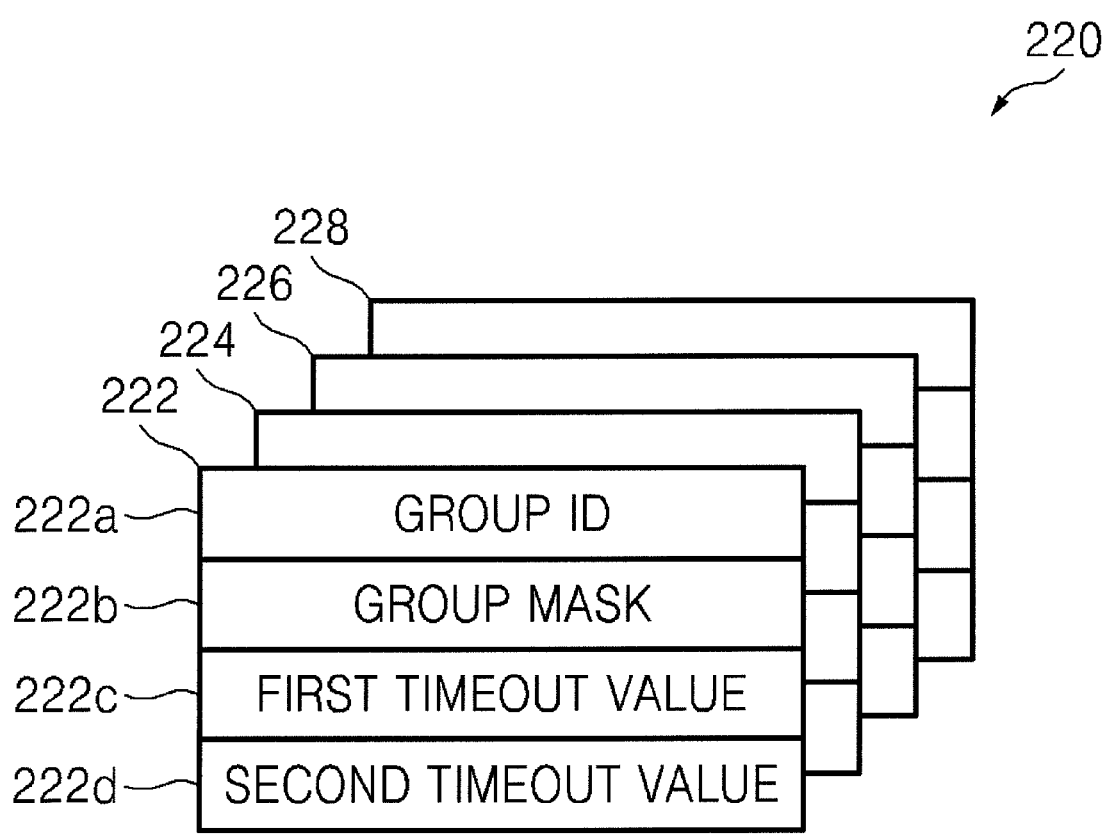
FIG. 5 is a conceptual diagram of a register block illustrated in FIG. 4 according to an exemplary embodiment of the present inventive concept.

The register block 220 sets a timeout value for each of the masters 120 through 150 in response to a timeout index signal output from the synchronous logic circuit 210. FIG. 5 is a conceptual diagram of the register block 220 illustrated in FIG. 4 according to an exemplary embodiment of present inventive concept. Referring to FIG. 5, the register block 220 includes registers 222, 224, 226, and 228 corresponding to the masters 120 through 150, respectively. While FIG. 5 shows only one register respectively corresponding to each of the four masters 120 through 150, the present inventive concept is not limited thereto. For example, one or more of the four masters 120 through 150 may be assigned multiple registers.

Referring to FIG. 5, each of the masters 120 through 150 may be identified by a group identification (ID) 222a indicating which master group each master belongs to and a group mask 222b identifying the particular master in the master group. For example, a first master in a first master group may be indicated by "0001", i.e., a combination of a group ID binary number "00" and a group mask binary number "01". A third master in a second master group may be indicated by "0111", i.e., a combination of a group ID binary number "01" and a group mask binary number "11".

Each of the registers 222, 224, 226, and 228 may store timeout values, i.e., a first timeout value 222c and a second timeout value 222d of a corresponding master. In FIG. 5, only two timeout values are stored in each of the registers 222, 224, 226, and 228, but the present inventive concept is not limited thereto. For example, one or more of the registers 222, 224, 226, and 228 may store a single or more than two timeout values.

In an exemplary embodiment of the inventive concept, a master of a first master group may have at least two different timeout values based on the residual capacity of a data buffer included therein, while a master of second master group may have only one fixed timeout value. Multiple timeout values for the first master group may be preset according to the structure of the semiconductor memory system 100 and updated when they vary with an operating environment.

In response to a timeout index signal, the register block 220 may select a master, for which a timeout value will be set, and selectively output one of the timeout values 222c or 222d. A master of the second master group may have a fixed timeout index signal and a fixed timeout value.

A procedure for setting a timeout value for each of the devices of the first master group (e.g., masters 130 through 150) will be described in detail with reference to FIGS. 3 through 5 below.

An example where a command generated by one master (e.g., 130) of the first master group (e.g., 130 through 150) is sent to the semiconductor memory device 160 is a read command will be described. Referring to FIG. 3, when the residual capacity of the data buffer 132 is larger than the threshold value THD thereof, a timeout value for the first master 130 is set to be larger than a timeout value for a second master. This means that since the size of data stored in the data buffer 132 provided for the operation of the first master 130 is large enough not to disturb the real-time operation of the first master 130 for a predetermined period of time, a command generated by the second master is executed prior to the read command generated by the first master 130. However, when the residual capacity of the data buffer 132 of the first master 130 is less than the threshold value THD thereof, the timeout value for the first master 130 is set to be less than the timeout value for the second master. This means that since the size of data stored in the data buffer 132 provided for the operation of the first master 130 is so small that the real-time operation of the first master 130 may be disturbed, the read command generated by the first master 130 is executed prior to the command generated by the second master to allow more data to be written to the data buffer 132 of the first master 130.

In an example where a command generated by one master (e.g., 130) of the first master group (e.g., 130 through 150) is sent to the semiconductor memory device 160 is a write command, when the residual capacity of the data buffer 132 is larger than the threshold value THD thereof, the timeout value for the first master 130 is set less than the timeout value for the second master. When the residual capacity of the data buffer 132 is less than the threshold value THD thereof, the timeout value for the first master 130 is set to be larger than the timeout value for the second master.

Table 1 shows examples of timeout values of the masters 120 through 150 in the semiconductor memory system 100 illustrated in FIG. 1.

TABLE 1

| Masters | First timeout values (cycles) | Second timeout values (cycles) |
|---|---|---|
| CPU | 10 | X |
| LCD | 2 | 50 |
| TV | 2 | 50 |
| Peripheral device | 5 | 256 |

Referring to Table 1, on the basis of an operating clock cycle of the memory controller 200, the timeout value of the CPU 120 is fixed to 10 cycles; the first and second timeout values of the LCD 130 and the TV 140 are set to 2 cycles and 50 cycles, respectively; and the first and second timeout values of the peripheral device 150 are set to 5 cycles and 256 cycles, respectively.

A procedure for setting the timeout value of the LCD 130, when a command generated by the LCD 130 and sent to the semiconductor memory device 160 is a read command, will be described in detail with reference to Table 1 and FIGS. 3 through 5 below. The timeout value of the CPU 120 is fixed to 10 cycles, while the timeout value of the LCD 130 is variable.

When the residual capacity of the data buffer 132 is larger than the threshold value THD thereof, the LCD 130 generates the timeout index signal TI1 at a logic "1". In response to the timeout index signal at the logic "1", the register block 220 generates the second timeout value, i.e., 50 cycles, which is larger than the timeout value, i.e., 10 cycles of the CPU 120. Accordingly, when the residual capacity of the data buffer 132 is large enough, a command generated by the CPU 120 is given priority over the read command generated by the LCD 130.

However, when the residual capacity of the data buffer 132 is less than the threshold value THD thereof, the LCD 130 generates the timeout index signal TI1 at a logic "0". In response to the timeout index signal at the logic "0", the register block 220 generates the first timeout value, i.e., 2 cycles, which is less than the timeout value, i.e., 10 cycles of the CPU 120. Accordingly, when the residual capacity of the data buffer 132 is not big enough, the read command generated by the LCD 130 is given priority over the command generated by the CPU 120.

The timeout counter 230 counts the timeout value of each of the masters 120 through 150 and outputs a count result to the queue 240. The queue 240 changes the execution order of commands based on the counting, thereby enabling the efficient operations of the masters 120 through 150.

Figure 6:
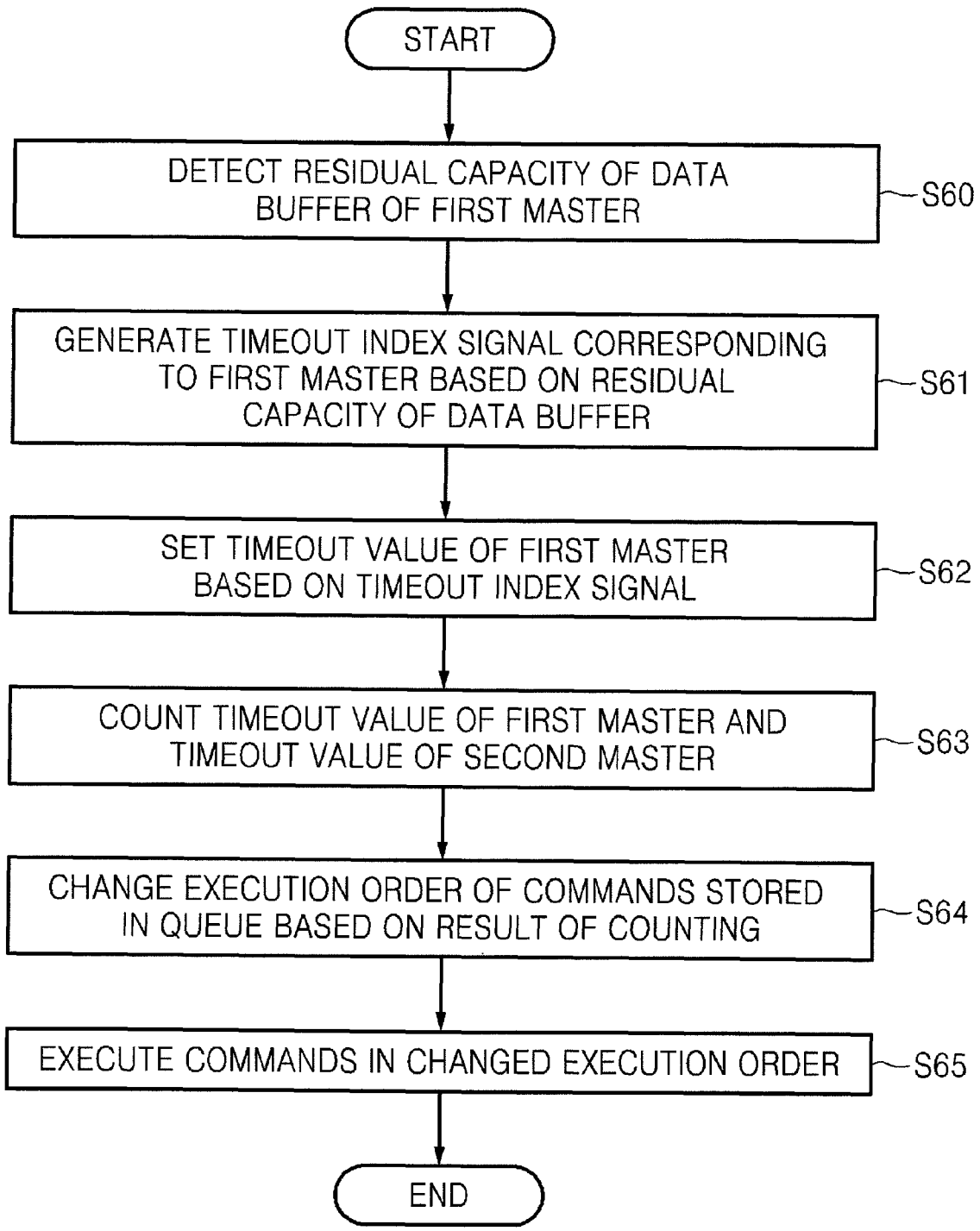
FIG. 6 is a flowchart of a method of operating a semiconductor memory system according to an exemplary embodiment of the present inventive concept.

FIG. 6 is a flowchart of a method of operating the semiconductor memory system 100 according to an exemplary embodiment of the present inventive concept. Referring to FIG. 1 and FIGS. 3 through 6, a first master (e.g., the LCD 130) detects a residual capacity of the data buffer 132 in operation S60. The first master compares the detected residual capacity of the data buffer 132 with the threshold value THD stored in the register 131 and generates a timeout index signal corresponding to the first master based on a result of the comparison in operation S61. The timeout index signal corresponding to the first master may vary with the comparison result.

The register block 220 of the memory controller 200 sets and outputs a timeout value of the first master based on the timeout index signal corresponding to the first device master in operation S62. The register block 220 outputs a fixed timeout value of a second master in response to a predetermined timeout index signal.

Subsequently, the timeout counter 230 counts the timeout value output from the register block 220 for each of the masters 120 through 150 and reports the completion of the counting for each of the masters 120 through 150 to the queue 240 in operation S63. For example, the timeout counter 230 may be set to the timeout value, and decrement itself periodically until reaching 0. The queue 240 changes the execution order of commands based on a count result received from the timeout counter 230 in operation S64. The semiconductor memory device 160 executes the commands in the changed execution order in operation S65.

Figure 7:
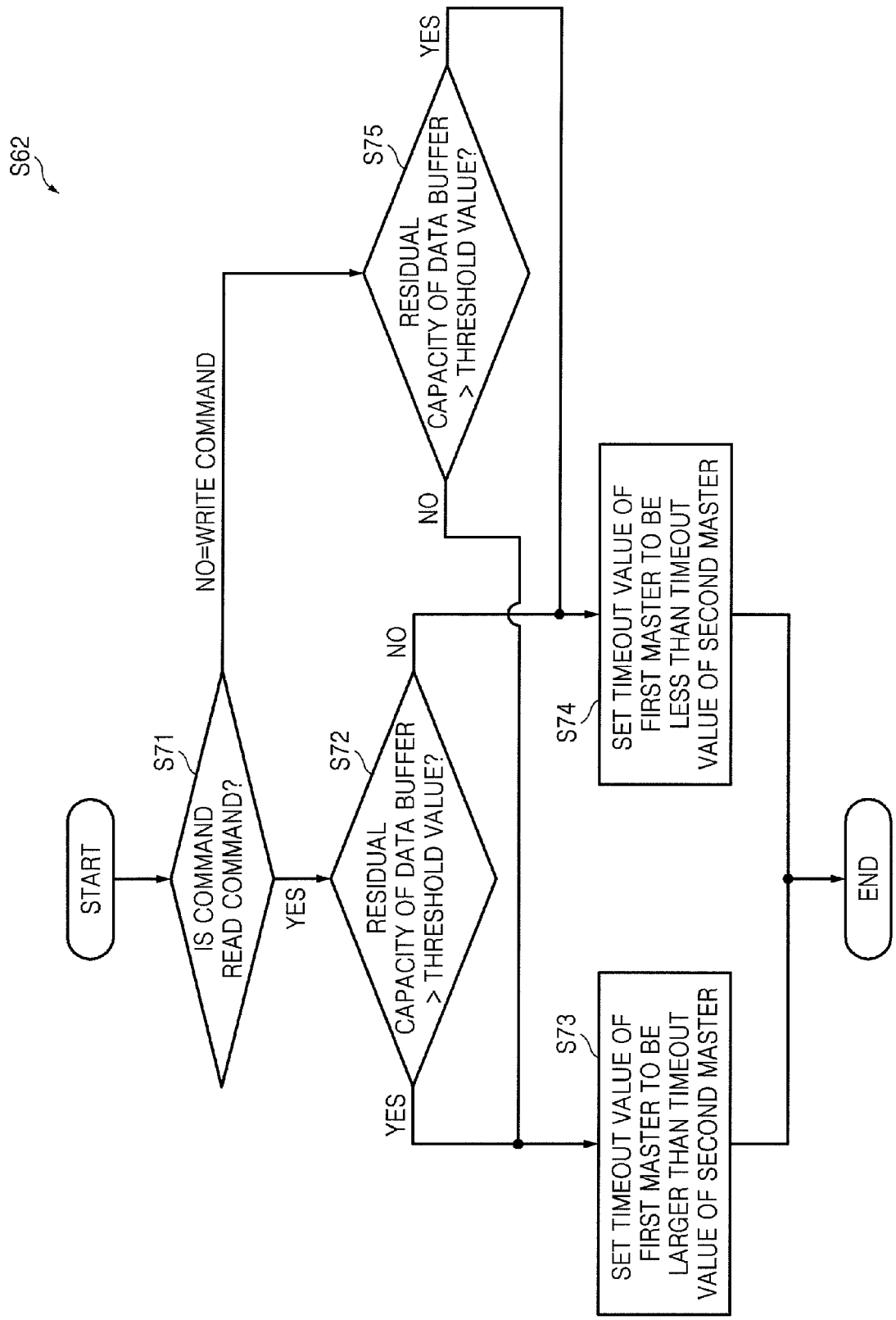
FIG. 7 is a flowchart of an operation of setting a timeout value for a first master in the method illustrated in FIG. 6 according to an exemplary embodiment of the present inventive concept.

FIG. 7 is a flowchart of operation S62 of setting the timeout value for the first master in the method illustrated in FIG. 6 according to an exemplary embodiment of the present inventive concept. Referring to FIG. 1 and FIGS. 3 through 7, the semiconductor memory system 100 determines whether a command generated by the first master and send to the semiconductor memory device 160 is a read command in operation S71. When the command of the first master is the read command, the semiconductor memory system 100 determines whether the residual capacity of the data buffer 132 is larger than the threshold value THD of the residual capacity of the data buffer 132 in operation S72.

When the residual capacity of the data buffer 132 is larger than the threshold value THD, the semiconductor memory system 100 sets the timeout value of the first master to be larger than the timeout value of the second master in operation S73. When the residual capacity of the data buffer 132 is not larger than the threshold value THD, the semiconductor memory system 100 sets the timeout value of the first master to be less than the timeout value of the second master in operation S74.

When the command of the first master sent to the semiconductor memory device 160 is not the read command (e.g., when the command is a write command), the semiconductor memory system 100 determines whether the residual capacity of the data buffer 132 is larger than the threshold value THD of the residual capacity of the data buffer 132 in operation S75. With respect to the write command, the semiconductor memory system 100 sets the timeout value of the first master to be less than the timeout value of the second master in operation S74 when the residual capacity of the data buffer 132 is larger than the threshold value THD and sets the timeout value of the first master to be larger than the timeout value of the second master in operation S73 when the residual capacity of the data buffer 132 is not larger than the threshold value THD.

The methods of the invention can also be embodied as computer readable codes on a computer readable recording medium. The computer readable medium or computer readable recording medium is any data storage device that can store data which can be thereafter read by a computer system. For example, the medium may include program storage devices such as a hard disk, magnetic floppy disk, RAM, ROM, CD ROM, etc., and be executable by any device or machine comprising suitable architecture, such as a general purpose digital computer having a processor, memory, and input/output interfaces.

As described above, according to at least one exemplary embodiment of the present inventive concept, timeout values of a plurality of masters connected to a semiconductor memory device are controlled in a semiconductor memory system so that the priority order of commands to be processed by the semiconductor memory system is dynamically determined. Accordingly, the overall performance of the semiconductor memory system can be improved.

While the present inventive concept has been particularly shown and described with reference to exemplary embodiments thereof, it will be understood by those of ordinary skill in the art that various changes in forms and details may be made therein without departing from the spirit and scope of the disclosure.

What is claimed is:

1. A method of operating a semiconductor memory device connected with a first master group including at least one first master and a second master group including at least one second master through a data bus, the method comprising:
   receiving, by the memory device, a timeout index signal from a first master of the first master group, wherein the timeout index signal indicates whether a residual capacity of a data buffer of the first master exceeds a threshold;
   selecting, by the memory device, one of first and second timeout values defined for the first master based on the timeout index signal, wherein the selected timeout value is different from a third timeout value selected by the memory device for the second master of the second group among the third timeout value and a fourth timeout value defined for the second master;
   counting, by the memory device, until one of the selected timeout value for the first master and the third timeout value for the second master is reached first; and
   assigning a first command from the first master of commands stored in a queue of the memory device a higher execution priority than a second command from the second master of the commands stored in the queue of the memory device if the selected timeout value for the first master is reached first and assigning the second command a higher execution priority than the first command otherwise.

2. The method of claim 1, wherein the first master detects the residual capacity of the data buffer based on a difference between a position of a writing pointer of the data buffer and a position of a reading pointer of the data buffer, compares the residual capacity of the data buffer with a threshold value of the residual capacity of the data buffer, and generates the timeout index signal based on a result of the comparison.

3. The method of claim 2, further comprising setting the second timeout value to a fixed value, and setting the first timeout value by:
   selecting one of the first master of the first master group based on a group identification and a group mask; and
   setting one value among a plurality of cycles of the first time out value corresponding to the timeout index signal as a timeout value of the selected first master.

4. The method of claim 1, wherein the method comprises initially selecting, by the memory device, one of third and fourth time out values defined for the second master as the selected timeout value for the second master.

5. The method of claim 3, wherein the selected first master sets the timeout index signal to a first value when the comparing indicates the residual capacity of the data buffer is greater than the threshold value and sets the timeout index signal to a second and different value when the comparing indicates the residual capacity of the data buffer is less than or equal to the threshold value.

6. The method of claim 5, wherein when a command is a read command, the setting of the first timeout value in response to the timeout index signal comprises: setting the first timeout value to be larger than the second timeout value when the residual capacity of the data buffer is larger than the threshold value, and setting the first timeout value to be less than the second timeout value when the residual capacity of the data buffer is less than the threshold value.

7. The method of claim 5, wherein when a command is a write command, the setting of the first timeout value in response to the timeout index signal comprises: setting the first timeout value to be less than the second timeout value when the residual capacity of the data buffer is larger than the threshold value, and setting the first timeout value to be larger than the second timeout value when the residual capacity of the data buffer is less than the threshold value.

8. The method of claim 3, further comprising synchronizing an operating frequency of the first masters of the first master group and an operating frequency of the second masters of the second master group with a driving frequency of the semiconductor memory device.

9. The method of claim 8, wherein the timeout index signal is received from the first master of the first master group to the semiconductor memory device through a route separate and independent of the data bus.

10. A computer readable medium storing a computer program to perform method steps for execution by a processor to operate a semiconductor memory device connected with a first master group including at least one first master and a second master group including at least one second master through a data bus, the method comprising:
    receiving, by the memory device, a timeout index signal from a first master of the first master group, wherein the timeout index signal indicates whether a residual capacity of a data buffer of the first master exceeds a threshold;
    selecting, by the memory device, one of first and second timeout values defined for the first master based on the timeout index signal, wherein the selected timeout value is different from a third timeout value selected by the memory device for the second master of the second master group among the third timeout value and a fourth timeout value defined for the second master;
    counting, by the memory device, until one of the selected timeout value for the first master and the third timeout value for the second master is reached first; and
    assigning a first command from the first master of commands stored in a queue of the memory device a higher execution priority than a second command from the second master of the commands stored in the queue of the memory device if the selected timeout value for the first master is reached first and assigning the second command a higher execution priority than the first command otherwise.

11. A semiconductor memory device connected with a first master group including at least one first master and a second master group including at least one second master through a data bus and including a memory controller, wherein the memory controller comprises:
    a plurality of register blocks configured to receive a timeout index signal from the first master and select one of first and second timeout values defined for the first master based on the timeout index signal, wherein the timeout index signal indicates whether a residual capacity of a data buffer of the first master exceeds a threshold and the selected timeout value is different from a third timeout value selected for the second master among the third timeout value and a fourth timeout value defined for the second master;
    a timeout counter configured to count until one of the selected timeout value for the first master and the third timeout value for the second master is reached first; and
    a queue configured to receive commands and store the commands,
    wherein a first command from the first master of the commands is assigned a higher execution priority than a second command from the second master of the commands if the selected timeout value is reached first and the second command is assigned a higher execution priority than the first command otherwise.

12. The semiconductor memory device of claim 11, wherein the first master comprises:
    a data buffer;
    a residual capacity detector configured to detect and output the residual capacity of the data buffer; and
    a comparator configured to compare the residual capacity with a predefined threshold capacity value to output the timeout index signal to the memory controller,
    wherein each register block comprises:
    a first register storing a first cycle of the first timeout value and a second cycle of the first timeout value for the first master; and
    a second register storing the second timeout value for the second master,
    wherein the first cycle of the first timeout value is less than the second timeout value and the second cycle of the first timeout value is greater than the second timeout value, and wherein the timeout counter counts the second timeout value and counts a selected one of the first cycle of the first timeout value and the second cycle of the first timeout value based on the timeout index signals.

13. The semiconductor memory device of claim 11, wherein the memory controller further includes a synchronous logic circuit to synchronize an operating frequency of the first master and the second master with the semiconductor memory device.

14. The semiconductor memory device of claim 12, wherein each of the registers includes an identifier identifying the corresponding master group, and a mask identifying the corresponding master.

15. The semiconductor memory device of claim 11, wherein the data buffer of the first master is configured to output a position of a write pointer and a position of a read pointer to the residual capacity detector, and wherein the residual capacity detector detects the residual capacity based on a difference between the position of the write pointer and the position of the read pointer.

16. The semiconductor memory device of claim 12, wherein when the command of the first master is a read command, the memory controller selects the first cycle of the first timeout value when the timeout index signal indicates that the residual capacity of the data buffer is less than the threshold capacity value, and selects the second cycle of the first timeout value when the timeout index signal indicates that the residual capacity of the data buffer is greater than the threshold capacity value.

17. The semiconductor memory device of claim 12, wherein when the command of the first master is a write command, the memory controller selects the second cycle of the first timeout value when the timeout index signal indicates that the residual capacity of the data buffer is less than the threshold capacity value, and selects the first cycle of the first timeout value when the timeout index signal indicates that the residual capacity of the data buffer is greater than the threshold capacity value.

18. The semiconductor memory device of claim 11, wherein the first master generates transactions at predetermined intervals based on a clock of an image signal and the second master irregularly generates transactions according to an operation state.

19. The semiconductor memory device of claim 12, wherein the threshold capacity value is a predefined percentage of a size of the data buffer.

20. The semiconductor memory device of claim 11, wherein the timeout index signal is received from the first master through a route separate and independent of the data bus.

* * * * *